(12) United States Patent
Windsor (10) Patent No.: US 12,324,530 B2
(45) Date of Patent: Jun. 10, 2025

(54) NESTING MAGNETIC TABLEWARE

(71) Applicant: FULL WINDSOR, LLC, Los Angeles, CA (US)

(72) Inventor: Mark Windsor, Los Angeles, CA (US)

(73) Assignee: Full Windsor, LLC, Los Angeles, CA (US)

( * ) Notice: Subject to any disclaimer, the term of this patent is extended or adjusted under 35 U.S.C. 154(b) by 0 days.

(21) Appl. No.: 18/228,956

(22) Filed: Aug. 1, 2023

(65) Prior Publication Data
US 2024/0041234 A1 Feb. 8, 2024

Related U.S. Application Data

(60) Provisional application No. 63/395,435, filed on Aug. 5, 2022.

(51) Int. Cl.
*A47G 19/06* (2006.01)

(52) U.S. Cl.
CPC .......... *A47G 19/06* (2013.01); *F16B 2200/83* (2023.08)

(58) Field of Classification Search
CPC ..... A47G 19/06; A47G 19/02; F16B 2200/83; A63H 33/046; B25H 3/003; H01F 7/0252; B65D 21/0212; B65D 21/0213; B65D 21/0215
USPC ......................................... 220/574; 206/585
See application file for complete search history.

(56) References Cited

U.S. PATENT DOCUMENTS

| | | | | |
|---|---|---|---|---|
| 2,176,052 A * | 10/1939 | Beyer | ................... | A44C 5/0046 224/267 |
| 2,955,239 A * | 10/1960 | Rouse | ................... | H01F 7/0252 211/DIG. 1 |
| 4,863,033 A * | 9/1989 | Buj | ................... | A47G 19/06 D7/645 |
| 5,269,717 A | 12/1993 | Tardif | | |
| 5,294,000 A * | 3/1994 | Yanuzzi | ............... | A47G 19/065 206/557 |
| 5,938,066 A * | 8/1999 | DeMars | ................ | A47G 21/00 D7/505 |
| 8,841,981 B2 | 9/2014 | Fullerton et al. | | |

(Continued)

FOREIGN PATENT DOCUMENTS

| CN | 216932624 U | 7/2022 | | |
|---|---|---|---|---|
| GB | 2482143 A * | 1/2012 | ............. | A47G 19/06 |

(Continued)

OTHER PUBLICATIONS

Int'l Search Report and Written Opinion of the International Searching Authority for PCT/US23/029397, Oct. 26, 2023.

*Primary Examiner* — Andrew D Perreault
(74) *Attorney, Agent, or Firm* — Bochner PLLC; Eric R Kleinertz (57) ABSTRACT

A system of nesting magnetic tableware comprises two pieces of tableware, each including a well, a substantially planar rim extending from the well, the rim having opposing upper and lower surfaces, a magnet affixed to the rim either above the upper surface or below the lower surface, and a recess corresponding to the magnet in the surface of the rim opposing the surface of the rim to which the magnet is affixed. The magnet of one of the pieces of dishware engages the recess of the other piece of dishware when the two pieces of dishware are nested in a stack and the magnets thereof are placed in proximity to one another.

20 Claims, 10 Drawing Sheets

(56) References Cited

U.S. PATENT DOCUMENTS

| | | | | |
|---|---|---|---|---|
| 10,843,328 | B2 * | 11/2020 | Wacker | F16B 1/00 |
| 10,926,187 | B2 * | 2/2021 | Kennedy | A63H 33/26 |
| 2006/0218795 | A1 * | 10/2006 | Santa Cruz | A47G 19/06 30/147 |
| 2012/0111873 | A1 * | 5/2012 | Gabriel | A47G 19/06 220/574.1 |
| 2012/0248124 | A1 * | 10/2012 | Mitri | A47G 19/06 220/574.1 |
| 2014/0227939 | A1 * | 8/2014 | Kim | A63H 33/046 446/124 |
| 2015/0004869 | A1 * | 1/2015 | Kim | A63H 33/046 446/92 |
| 2015/0250338 | A1 | 9/2015 | Blais et al. | |
| 2015/0282655 | A1 * | 10/2015 | Donovan | A47G 19/06 30/142 |
| 2017/0095747 | A1 * | 4/2017 | Cheung | A63H 33/046 |

FOREIGN PATENT DOCUMENTS

| | | |
|---|---|---|
| KR | 20-0168646 Y1 | 2/2000 |
| NO | 317863 B1 | 12/2004 |

* cited by examiner

NESTING MAGNETIC TABLEWARE

CROSS-REFERENCES TO RELATED APPLICATIONS

This non-provisional application claims priority to U.S. Provisional Patent Application No. 63/395,435 entitled "NESTING MAGNETIC TABLEWARE" filed on Aug. 5, 2022, the entire disclosure of which is hereby incorporated herein.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to tableware. More particularly, the invention pertains to systems and methods for organizing, storing, and transporting tableware for outdoor use.

People everywhere enjoy cooking, serving, and eating food outside while picnicking, camping, boating, and RVing. However, outdoor food preparation, service, and consumption entails a number of unique problems that are typically not encountered indoors. For example, disposable tableware such as paper plates and bowls can blow away or tip over when subjected to a light breeze. They are also notoriously flimsy and therefore have limited utility in any environment. The same is also true of single use plastic utensils and cutlery. Disposable single use tableware of all kinds also has a marked negative impact on the environment.

By contrast, currently available reusable metal and ceramic tableware is stronger, less likely to blow away, and better for the environment, but rattles annoyingly and can become damaged or even break if sufficiently shaken during transport. Furthermore, travel-induced jostling can often cause even the most carefully stacked and packed tableware to become inconveniently jumbled inside the camping boxes and drawers commonly used to store and transport such items. Additionally, metal and ceramic tableware tend not to be very compact, which is an important concern for outdoor activities due to the limited storage space available in boats, RVs, backpacks, and the like.

Accordingly, what is needed are improvements in tableware.

BRIEF SUMMARY OF THE INVENTION

This Brief Summary is provided to introduce a selection of concepts in a simplified form that are further described below in the Detailed Description. This Brief Summary is not intended to identify key features or essential features of the claimed subject matter, nor is it intended to be used as an aid in determining the scope of the claimed subject matter. Features of the presently disclosed invention overcome or minimize some or all of the identified deficiencies of the prior art, as will become evident to those of ordinary skill in the art after a study of the information presented in this document.

Aspects of the present invention provide a system of nesting magnetic tableware. The system of nesting magnetic tableware can be embodied in a tableware set that includes or more pieces of dishware that are configured to nest within one another and remain magnetically engaged with one another in an organized and tidy stack until separated by a user. In some embodiments, the system of tableware can also include one or more utensils that are configured to magnetically engage a portion of each piece of dishware so as to make the utensils easier to carry and to hold the utensils conveniently on the dishware, away from unhygienic surfaces, when not in use.

Each piece of dishware includes a well, a protruding rim, and at least one alignment magnet affixed to the rim. Each alignment magnet can protrude from an upper or lower surface of the rim. The rim of each piece of dishware also has at least one recess in a surface of the rim opposing the surface from which the alignment magnet protrudes. Each recess corresponds to an alignment magnet. Each corresponding recess is vertically aligned with each respective magnet on the same piece of dishware. Each piece of dishware can have multiple vertically aligned magnets and corresponding recesses spaced around the rim thereof, including on opposite lateral sides of the well of the piece of dishware. Each recess is shaped and sized to at least partially receive an alignment magnet of another piece of dishware. As such, when multiple pieces of dishware are nested in a stack with their respective alignment magnets is proximity to one another, each alignment magnet of each piece of dishware is drawn into the corresponding recess of an adjacent piece of dishware and thereby engages the respective alignment magnet of each adjacent piece of dishware in the nested stack. This maintains all the pieces of dishware in an aligned and orderly stack until a user removes a desired piece of dishware for use.

In one aspect, a system of nesting magnetic tableware comprises a first piece of dishware. The first piece of dishware can include a well, a substantially planar rim extending from the well, the rim having opposing upper and lower surfaces, a magnet affixed to the rim either above the upper surface or below the lower surface, and a recess corresponding to the magnet in the surface of the rim opposing the surface of the rim to which the magnet is affixed.

In another aspect, a system of nesting magnetic tableware comprises a first piece of dishware and a second piece of dishware. The first piece of dishware can include a well, a rim extending from the well, the rim defining a pair of substantially planar tabs extending from opposing lateral sides of the well, each tab having opposing upper and lower surfaces, a pair of magnets affixed to the pair of substantially planar tabs either above the upper surfaces or below the lower surfaces thereof, and a pair of recesses corresponding to the pair of magnets in the surfaces of the tabs opposing the surfaces of the tabs to which the pair of magnets is affixed. The second piece of dishware can include a well, a rim extending from the well, the rim defining a pair of substantially planar tabs extending from opposing lateral sides of the well, each tab having opposing upper and lower surfaces, a pair of magnets affixed to the pair of substantially planar tabs either above the upper surfaces or below the lower surfaces thereof, and a pair of recesses corresponding to the pair of magnets in the surfaces of the tabs opposing the surfaces of the tabs to which the pair of magnets is affixed. One of the first or second pairs of magnets are pulled into engagement with one of the first or second pairs of recesses when the first and second pieces of dishware are nested in a stack and the first and second pairs of tabs are placed in proximity to one another.

In yet another aspect, a system of nesting magnetic tableware comprises a first piece of dishware and a second piece of dishware. The first piece of dishware includes a well, a rim extending radially outward from the well, the rim defining a first pair of substantially planar tabs extending from opposing lateral sides of the well, each tab having opposing upper and lower surfaces, a first pair of magnets affixed to the first pair of substantially planar tabs above the upper surfaces thereof, and a first pair of recesses in the lower surfaces of the first pair of substantially planar tabs, each recess sized and shaped to at least partially receive one of the first pair of magnets. The second piece of dishware is configured to nest at least partially within the first piece of dishware, and includes a well, a rim extending radially outward from the well, the rim defining a second pair of substantially planar tabs extending from opposing lateral sides of the well, each tab having opposing upper and lower surfaces, a second pair of magnets affixed to the second pair of substantially planar tabs above the upper surfaces thereof, and a second pair of recesses in the lower surfaces of the second pair of substantially planar tabs, each recess sized and shaped to at least partially receive one of the first pair of magnets. The first and second pairs of magnets pull the first pair of magnets into engagement with the second pair of recesses when the second piece of dishware is nested with the first piece of dishware and the second pair of tabs are placed in proximity to the first pair of tabs.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawings and in the description referring to the same or like parts.

DETAILED DESCRIPTION OF THE INVENTION

While the making and using of various embodiments are discussed in detail below, it should be appreciated that many applicable inventive concepts can be embodied in a wide variety of specific contexts. The specific embodiments discussed herein are merely illustrative of specific ways to make and use the invention and do not delimit the scope thereof.

To facilitate the understanding of the embodiments described herein, a number of terms are defined below. The terms defined herein have meanings as commonly understood by a person of ordinary skill in the areas relevant to the disclosure. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As used herein, the phrase "substantially planar" means that the article or surface so described is flat to the extent that any variance from perfectly flat is within commonly accepted manufacturing practices and tolerances applicable to the industry or product category to which the article or surface belongs. A surface or article need not be perfectly flat to be "substantially flat."

As used herein, the phrase "tableware" means dishware and utensils. The term "dishware" means any dish, container, or vessel used for preparing, serving, or eating food, such as plates, bowls, trays, and the like. The term "utensil" means any kitchen utensil, eating utensil, or other hand implement used for preparing, serving, or eating food, such as forks, knives, spoons, and the like.

As described herein, an upright position is considered to be the position of apparatus components while in proper operation or in a natural resting position as described herein. As used herein, the upright position of a tableware set, including dishware and utensils, is the position in which such items would be when resting on a level table arranged for normal use. That is, a bowl or plate in an upright position is generally lowest at its center such that the bowl or plate will hold a volume of liquid in the well of the bowl or plate without spilling. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without operator input or prompting, whether these features, elements and/or states are included or are to be performed in any particular embodiment.

Referring now to FIGS. 1-17, there is shown a system of nesting magnetic tableware 10. The system of nesting magnetic tableware 10 is embodied in FIGS. 1-4 by a tableware set including two pieces of nesting dishware, $B_1$ and P, and two utensils, F and K In this embodiment, one piece of dishware is a shallow bowl $B_1$ and the other piece of dishware is a plate P, while one utensil is a fork F and the other is a knife K. However, it is to be understood that the number of utensils and pieces of dishware depicted in the drawings is limited for purposes of clarity, and that in other embodiments, the number of utensils and pieces of dishware can be greater or fewer than shown in the drawings. It is also to be understood that the type of each utensil or piece of dishware can be different than what is shown in the drawings.

For example, in FIGS. 5-17 the system of nesting magnetic tableware 10 is alternatively embodied by a tableware set including two pieces of dishware in the form of two identical nesting bowls $B_2$, $B_2$. The pieces of dishware $B_2$, $B_2$ in the tableware set depicted in FIGS. 5-17 are identical in all respects to the pieces of dishware $B_1$, P in the tableware set depicted in FIGS. 1-4 except that bowls $B_2$ are deeper than either of bowl $B_1$ or plate P. It is to be understood that additional bowls $B_1$, $B_2$, plates P, and utensils such as fork F and knife K, or even differently shaped dishware and utensils (e.g., a spoon), can optionally be combined to form a tableware set customized to a given user's needs. Dishware $B_1$, $B_2$, P and utensils F, K suitable for use in system for nesting magnetic tableware 10 of the present invention can be formed from any desired polymeric or metallic material or combination of materials, including but not limited to polypropylene, carbon fiber, stainless steel, and aluminum.

Figure 1:
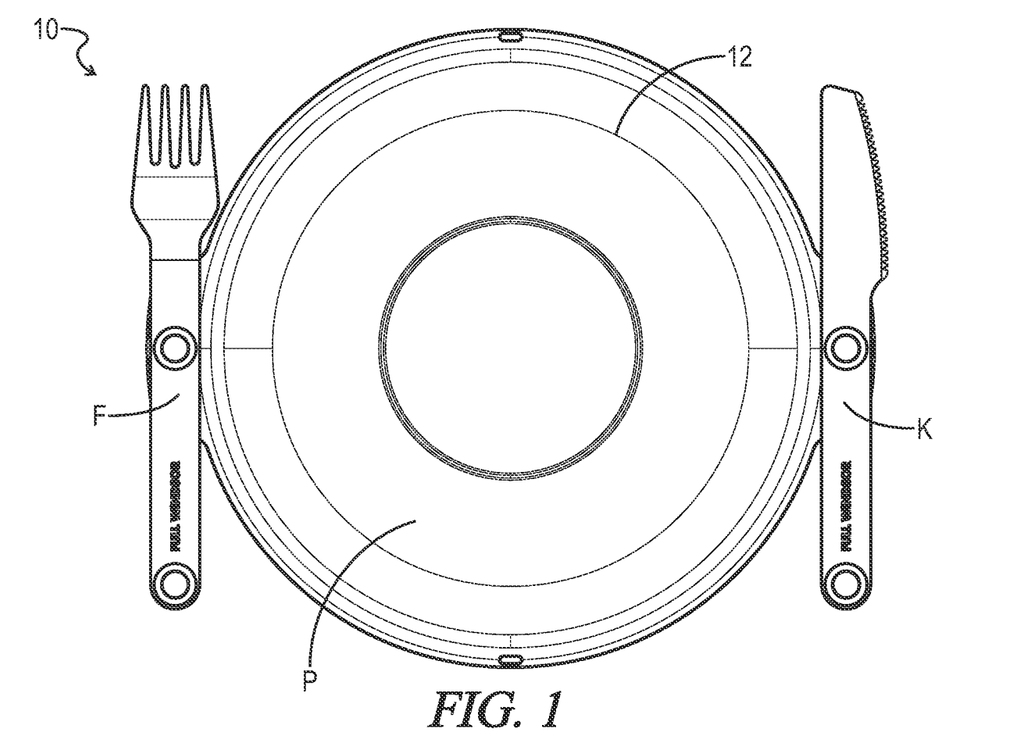
FIG. 1 is a top plan view of a nesting magnetic tableware set including a bowl, a plate, a fork, and a knife constructed in accordance with an embodiment of the present invention.
Figure 2:
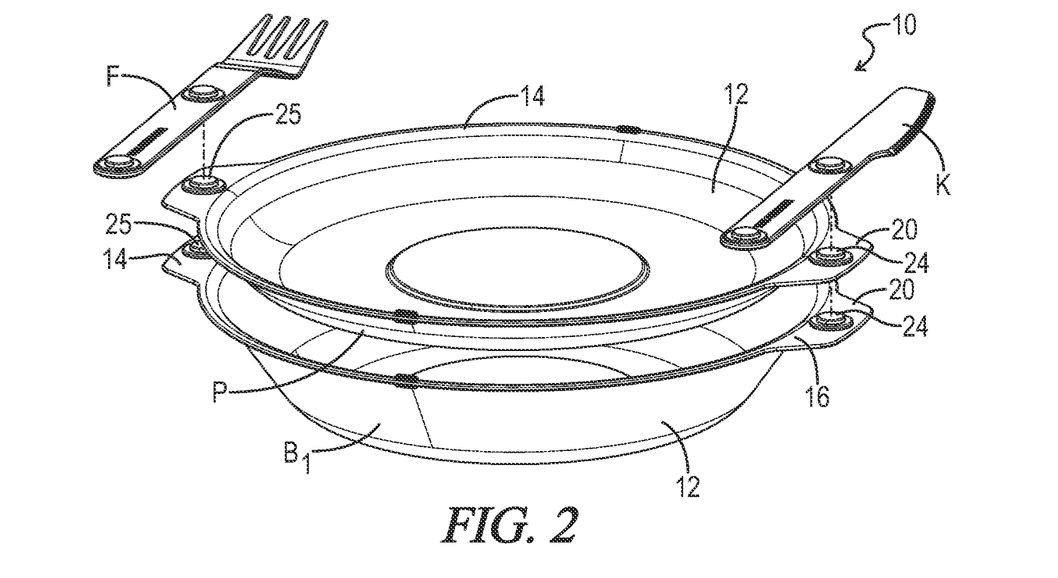
FIG. 2 is a partially exploded elevated isometric view of the tableware set of FIG. 1.
Figure 3:
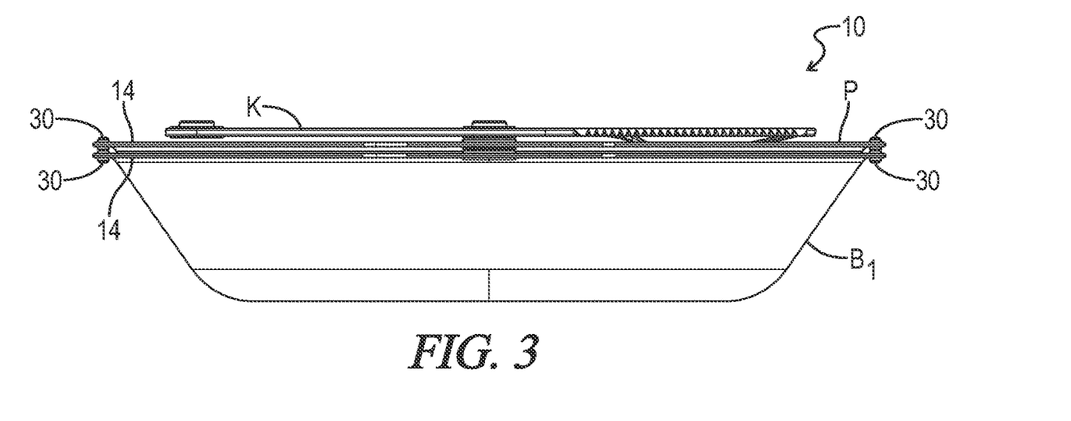
FIG. 3 is a side elevational view of the tableware set of FIG. 1. The bowl and plate are nested in a stack.
Figure 4:
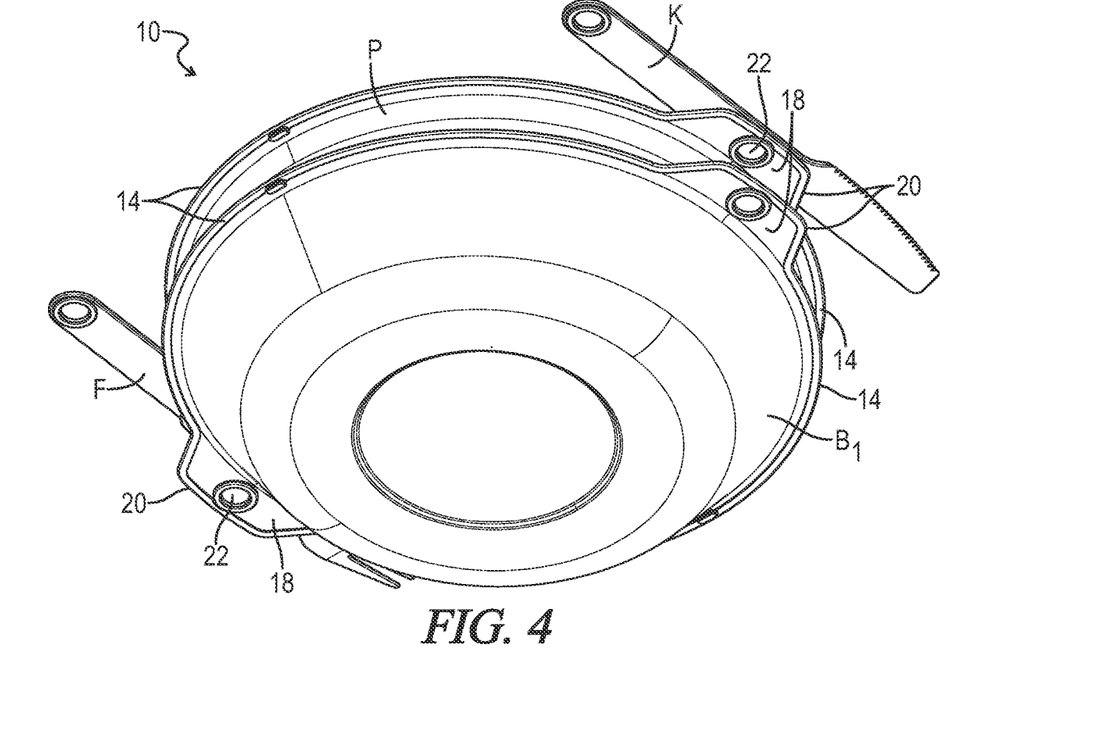
FIG. 4 is a partially exploded depressed isometric view of the tableware set of FIG. 1.
Figure 5:
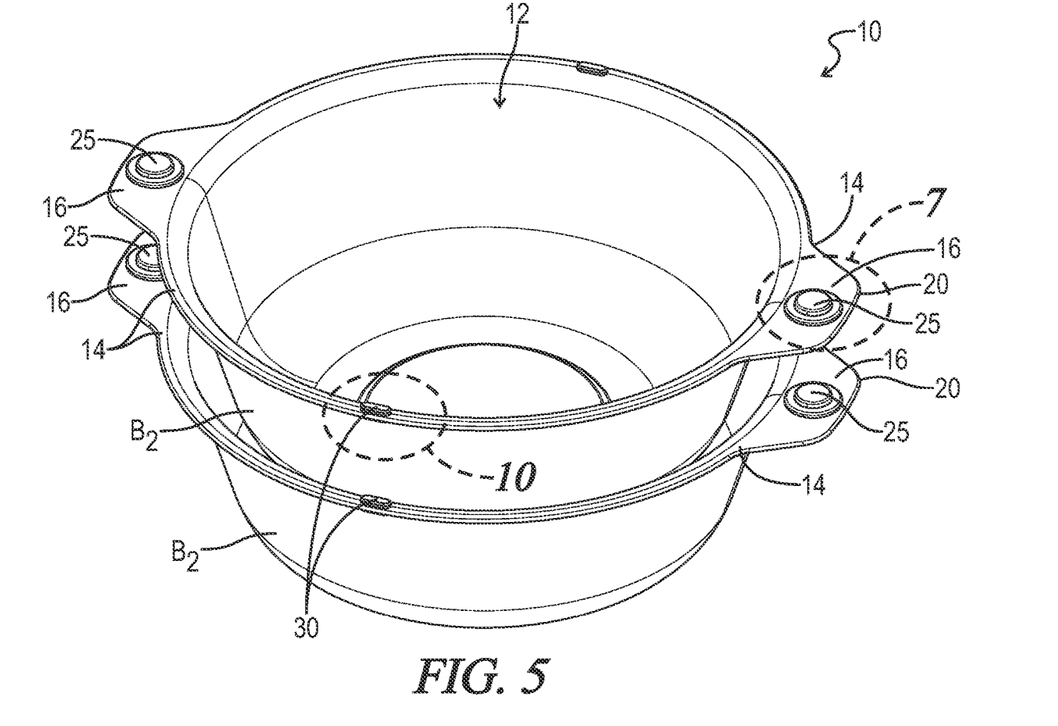
FIG. 5 is a partially exploded elevated isometric view of a nesting magnetic tableware set including a pair of bowls constructed in accordance with another embodiment of the present invention.
Figure 6:
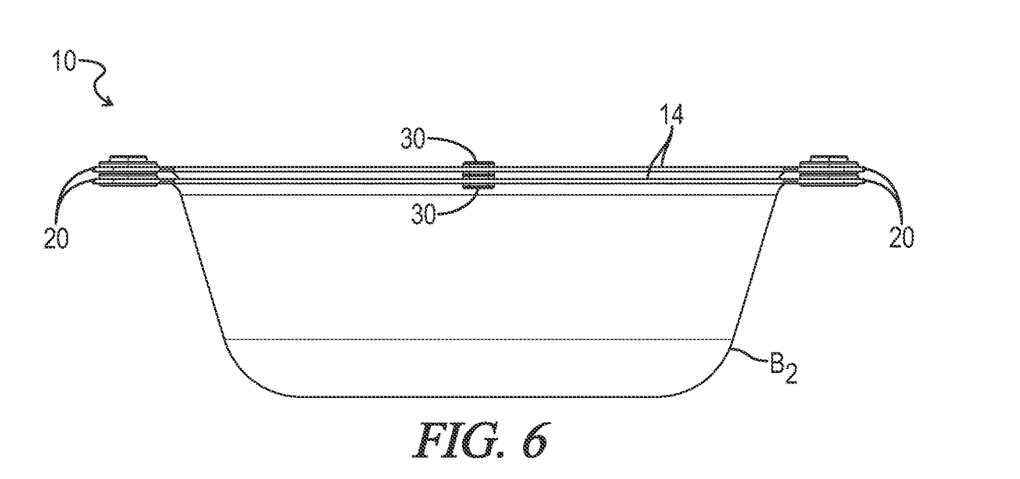
FIG. 6 is a side elevational view of the tableware set of FIG. 5 nested in a stack.
Figure 7:
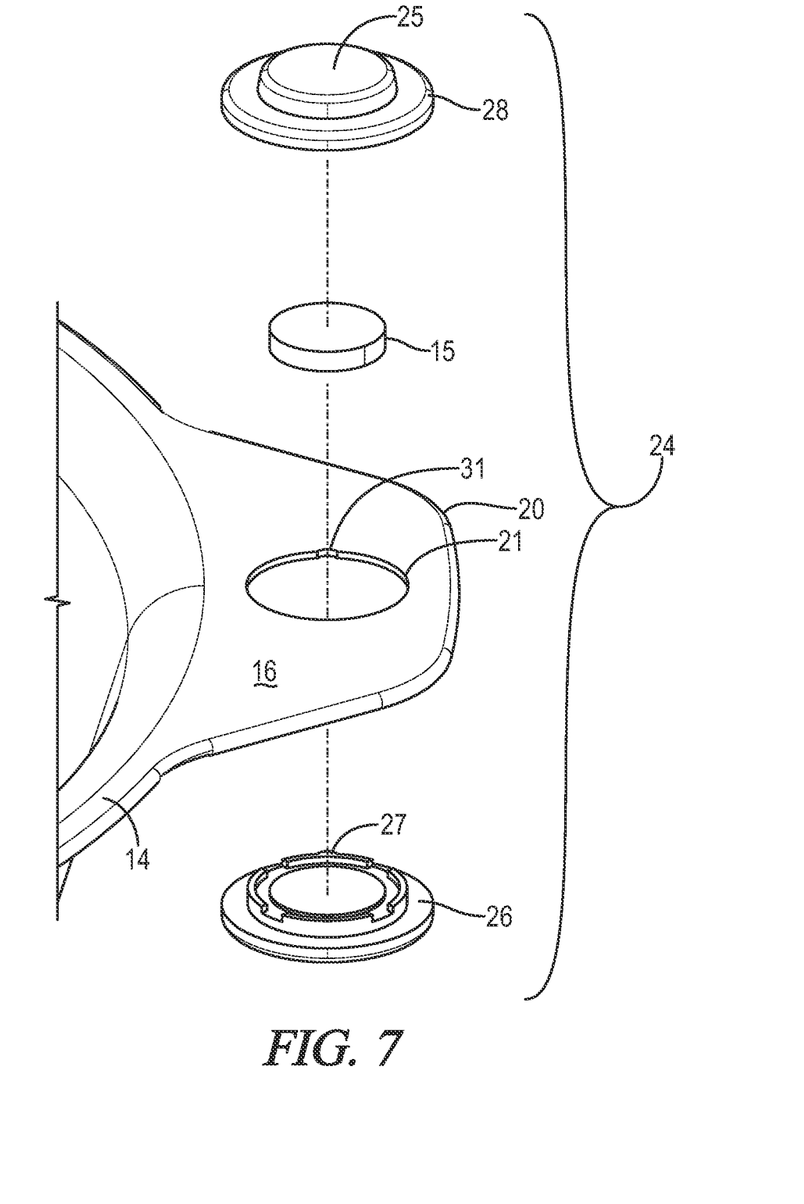
FIG. 7 is an exploded isometric view of the objects at location 7 of FIG. 5. The lowermost bowl is omitted for clarity.
Figure 8:
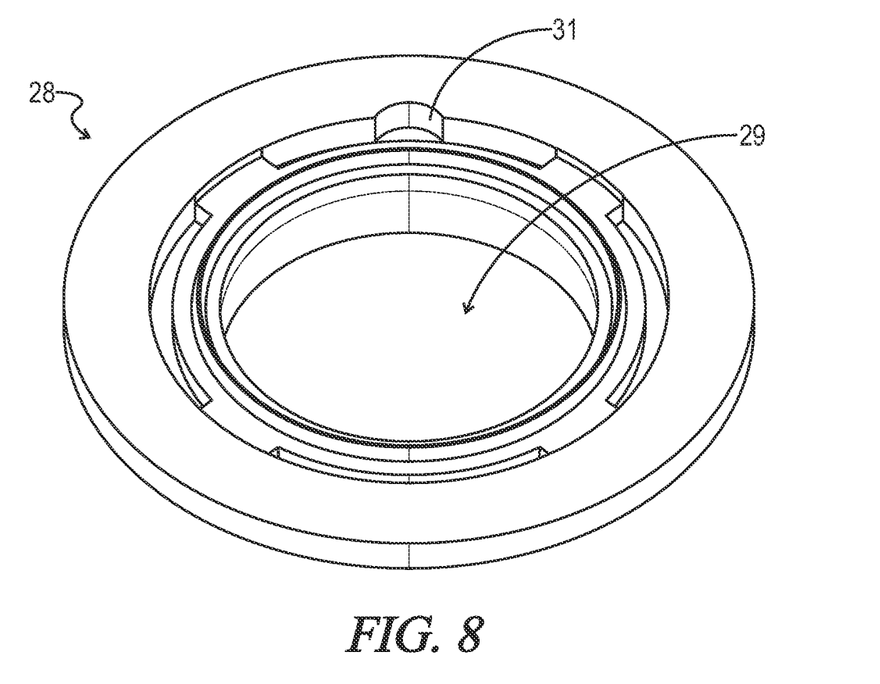
FIG. 8 is an isometric view of the interior of the male portion of the magnet housing of FIG. 7.
Figure 9:
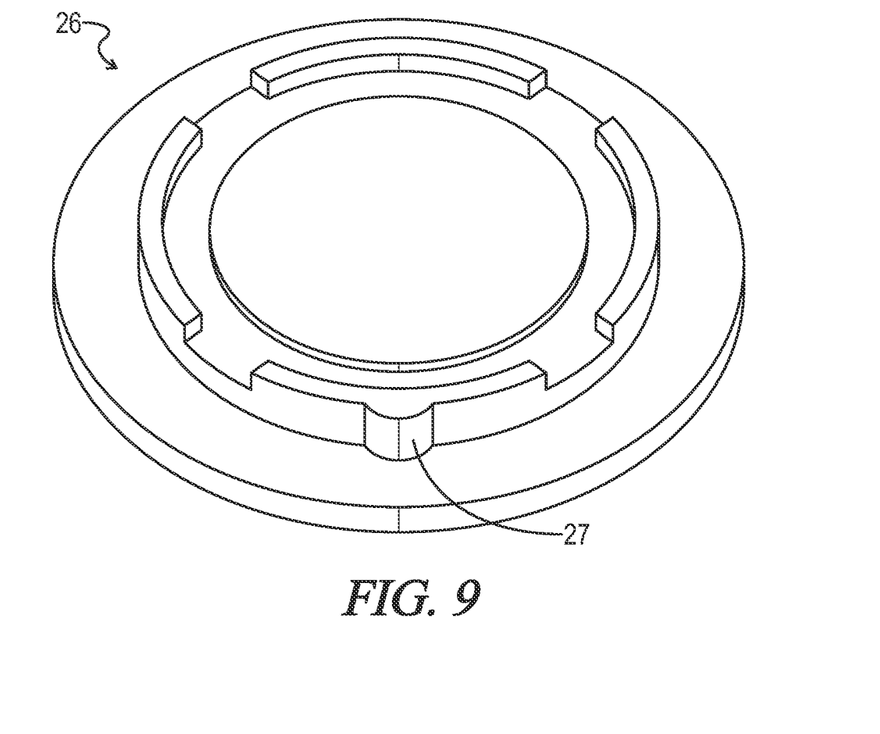
FIG. 9 is an isometric view of the interior of the female portion of the magnet housing of FIG. 7.
Figure 10:
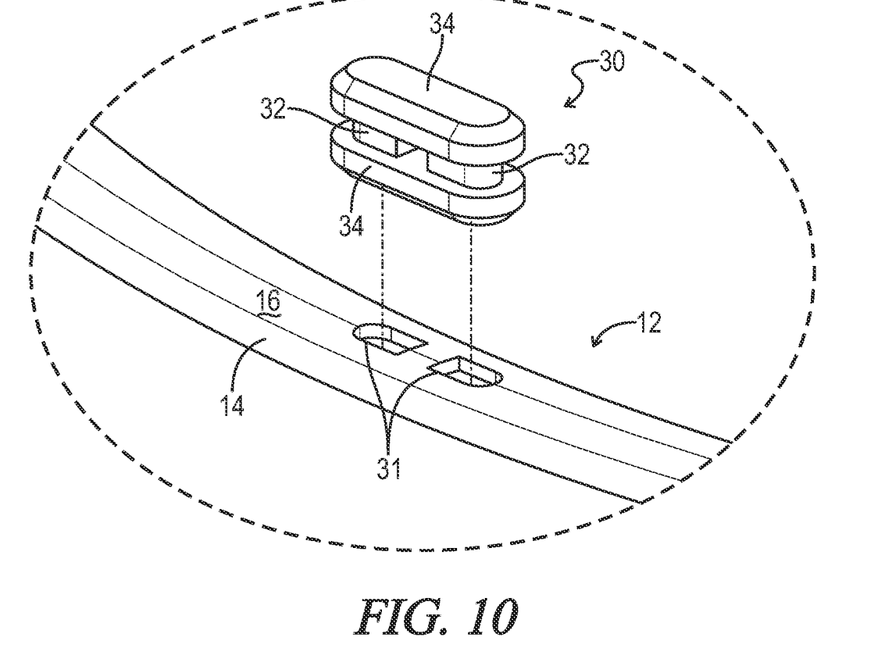
FIG. 10 is a partially exploded elevated isometric view of the objects at location 10 of FIG. 5.
Figure 11:
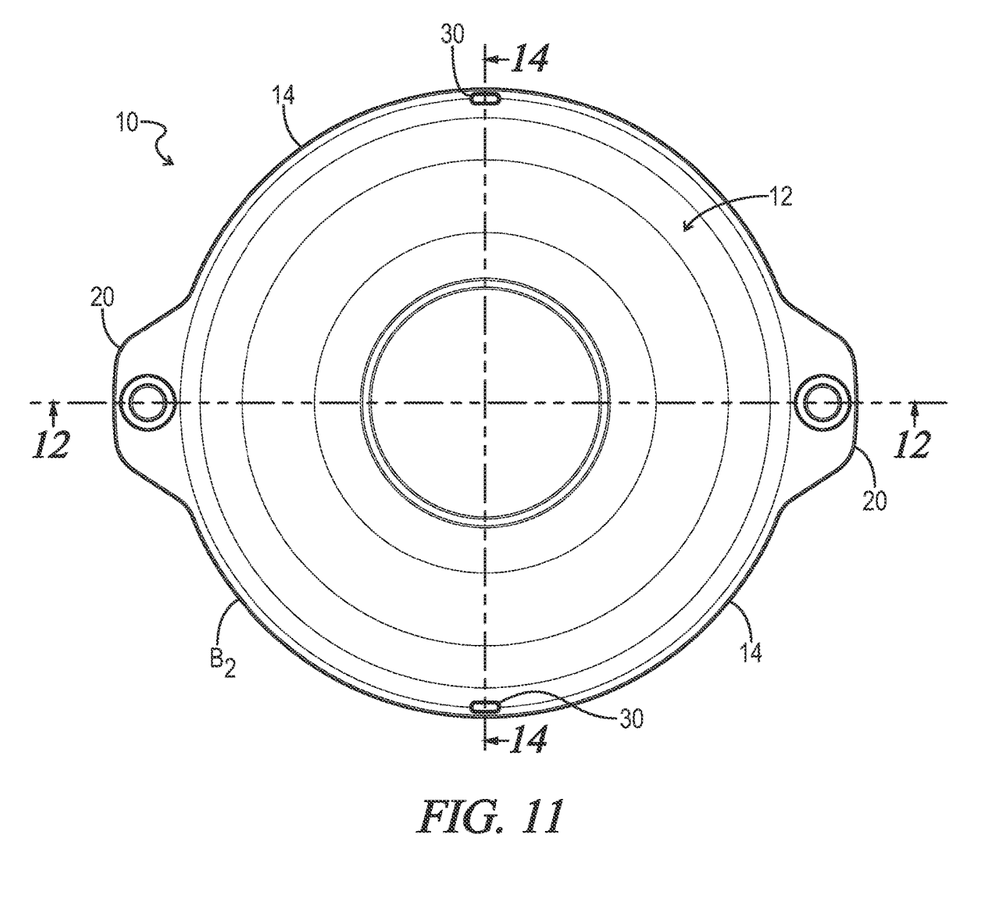
FIG. 11 is a top plan view of the tableware set of FIG. 5 nested in a stack.
Figure 12:
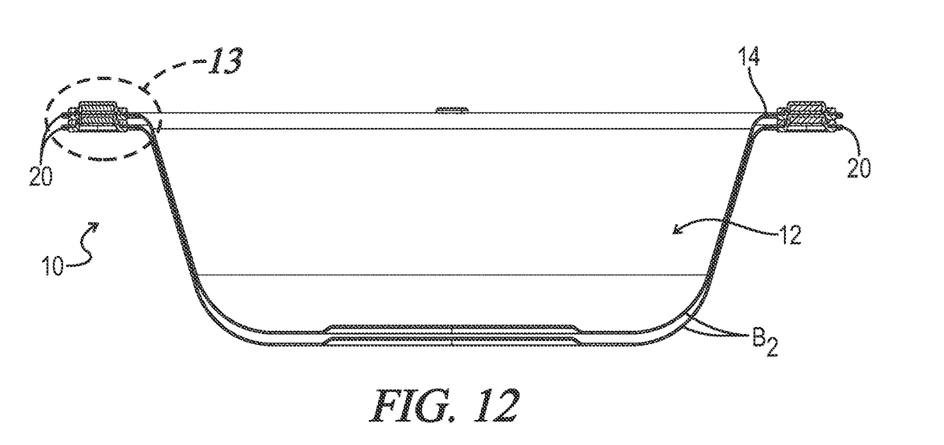
FIG. 12 is a sectional view taken along line 12-12 of FIG. 11.

Each piece of dishware in a system of nesting magnetic tableware 10 of the present invention, including but not limited to $B_1$, $B_2$, P, is configured to nest at least partially within another piece of dishware when stacked, as best shown in FIGS. 3 and 6. Each piece of dishware in a system of nesting magnetic tableware 10 includes a well 12, a rim 14, and one or more alignment magnets 15 affixed to the rim 14. In the illustrated embodiments, each piece of dishware includes a pair of alignment magnets 15 affixed to the rim 14. The well 12 defines a space in which a volume of liquid can be contained without spilling when the piece of dishware is in an upright position on a level surface. The well 12 has a depth and a width. Bowl $B_1$ has a well 12 with a depth greater than that of plate P, while bowls $B_2$ have a well 12 with a depth greater than that of either of bowl $B_1$ or plate P. The rim 14 of each piece of dishware is generally planar and extends horizontally outward the from the well 12. The pieces of dishware forming a tableware set can have any general shape (i.e., footprint), including but not limited to circular, square, and rectangular. In embodiments where the dishware has a generally circular shape, such as the bowls $B_1$, $B_2$, and plate P depicted in the drawings appended hereto, the rim 14 extends radially outward the from the well 12. In some embodiment, all pieces of dishware in the tableware set have rims 14 of similar inner and outer diameters, but the pieces themselves can vary in depth from the rim 14 (i.e., well depth) to form a plate P or different types and sizes of bowls $B_1$, $B_2$.

Referring again to FIGS. 1-17, the rim of each piece of dishware $B_1$, $B_2$, P includes a substantially planar upper surface 16 and an opposing substantially planar lower surface 18. Each rim 14 defines a pair of outwardly (i.e., horizontally) protruding tabs 20 at opposing lateral sides of the well 12. As such, each tab 20 of a pair is part of the rim 14 of a given piece of dishware $B_1$, $B_2$, P. The pair of tabs 20 serve as handles by which a user can easily carry a given piece of dishware $B_1$, $B_2$, P and avoid potential burns caused by hot food in the well 12. However, in other embodiments, the tabs 20 can be omitted and the rims 14 can have a uniform width around the perimeter of the well 12. In some embodiments, each rim 14 has a uniform width at least as wide as the diameter of the alignment magnets 15 affixed thereto.

Each pair of alignment magnets 15 is affixed to the tabs 20 above the upper surface 18 of the rim 14 of each piece of dishware $B_1$, $B_2$, P. Each alignment magnet 15 is spaced around the rim 14 from each other alignment magnet 15. As such, each pair of alignment magnets 15 is affixed to the rim 14 of each piece of dishware $B_1$, $B_2$, P at opposing lateral sides of the well 12. A pair of recesses 22 is defined in the lower surfaces 18 of the tabs 20 of each rim 14. Each recess 22 is vertically aligned with each respective alignment magnet 15 on the upper surface 18 of the rim 14 of the same piece of dishware. As such, each recess 22 in a given piece dishware rim 14 corresponds to each alignment magnet 15. In other embodiments, the pair of alignment magnets 15 can be affixed to the rim 14 (e.g., at a tab 20) below the lower surface 18, and the pair of corresponding recesses 22 can be formed in the upper surface 16 of the rim 14. As such, the alignment magnets 15 can be affixed to the rim 14 either above the upper surface 16 or below the lower surface 18, and the corresponding recesses 22 can be formed in the surface of the rim 14 opposing the surface of the rim 14 to which the magnets 15 are affixed.

Each recess 22 of each piece of dishware $B_1$, $B_2$, P is sized and shaped to at least partially receive an alignment magnet 15 of another piece of dishware $B_1$, $B_2$, P. Thus, the alignment magnets 15 of a first piece of dishware will fit into the corresponding recesses 22 of a second piece of dishware and engage the alignment magnets 15 of the second piece (see e.g., FIGS. 2-3 and 5-6). Likewise, each alignment magnet 15 of each piece of dishware is sized and shaped to be received in a recess 22 of another piece of dishware $B_1$, $B_2$, P or utensil F, K. In this way, the alignment magnets 15 of each piece of dishware are configured to engage the recesses 22 of an adjacent piece of dishware when multiple pieces of dishware are nested in a stack and the alignment magnets 15 of each respective adjacent piece of dishware are placed in proximity to one another, as best shown in FIGS. 2, 4-5, and 13. The alignment magnets 15 of each piece of dishware pull the magnets 15 of one piece into engagement with the recesses 22 of another piece when multiple pieces of dishware are nested and their tabs 20 are placed in proximity to one another. This maintains each piece of nested dishware in a neat and orderly stack. The use of pairs of protruding alignment magnets 15 and corresponding recesses 22 on each piece of dishware $B_1$, $B_2$, P provides two points of mating contact between adjacent pieces of dishware in a nested stack. This prevents individual pieces of dishware from spinning or rotating while nested in a stack.

Each piece of dishware is also configured to mount one or more utensils such as a fork F, a knife K, or a spoon (not shown) on the rim 14 thereof. Each utensil includes a substantially planar handle 26 having an upper surface 16 and a lower surface 18. A magnet 15 is affixed to the handle above the upper surface 16. A recess 22 is formed in the lower surface of the handle 26. The magnet 15 of a piece of dishware can engage the recess 22 of the utensil F, K when the magnet 15 of the utensil F, K is placed in placed in proximity to the tab 20 of the piece of dishware $B_1$, $B_2$, P. In this way, the utensils F, K are configured to attach to the alignment magnets about the rims 14 of pieces of dishware $B_1$, $B_2$, P to secure handle of a knife K, fork F, or spoon (not shown) to the piece of dishware so that wind or waves will not dislodge the utensils from the rim 14 of the piece of dishware. This also advantageously prevents utensils from being accidentally dropped on the ground and frees a user's hands from needing to separately carry or hold utensils when not in use.

Figure 13:
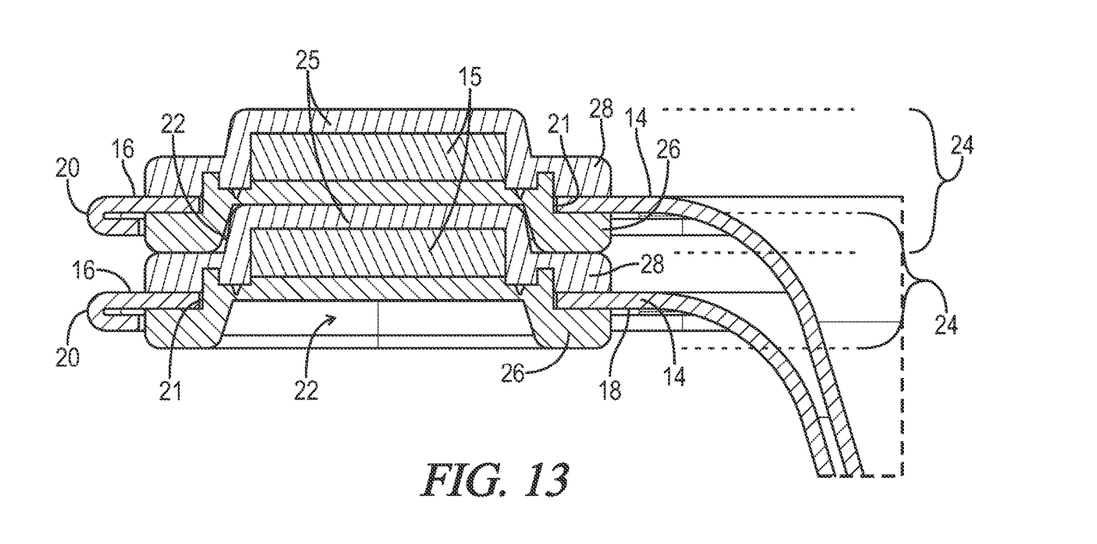
FIG. 13 is a magnified detail view of the objects at location 13 of FIG. 12.
Figure 14:
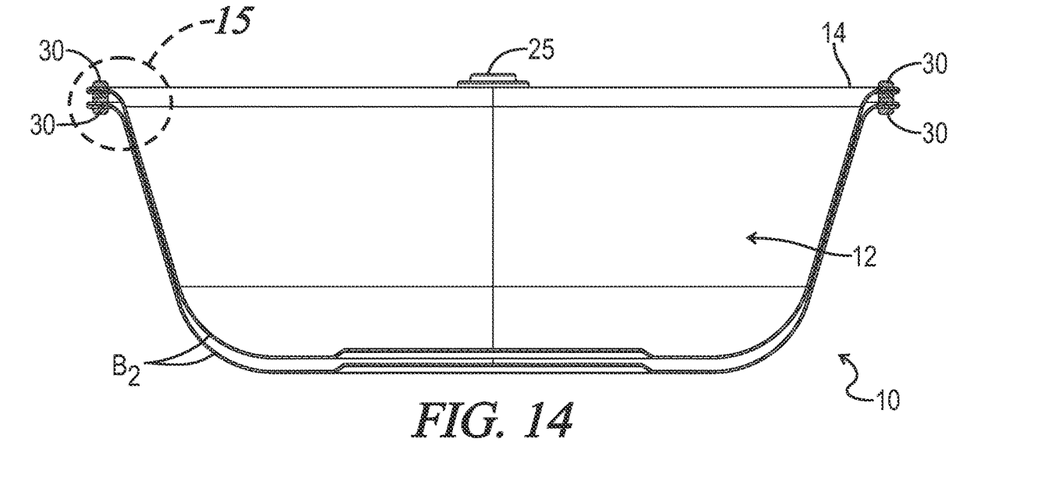
FIG. 14 is a sectional view taken along line 14-14 of FIG. 11.
Figure 15:
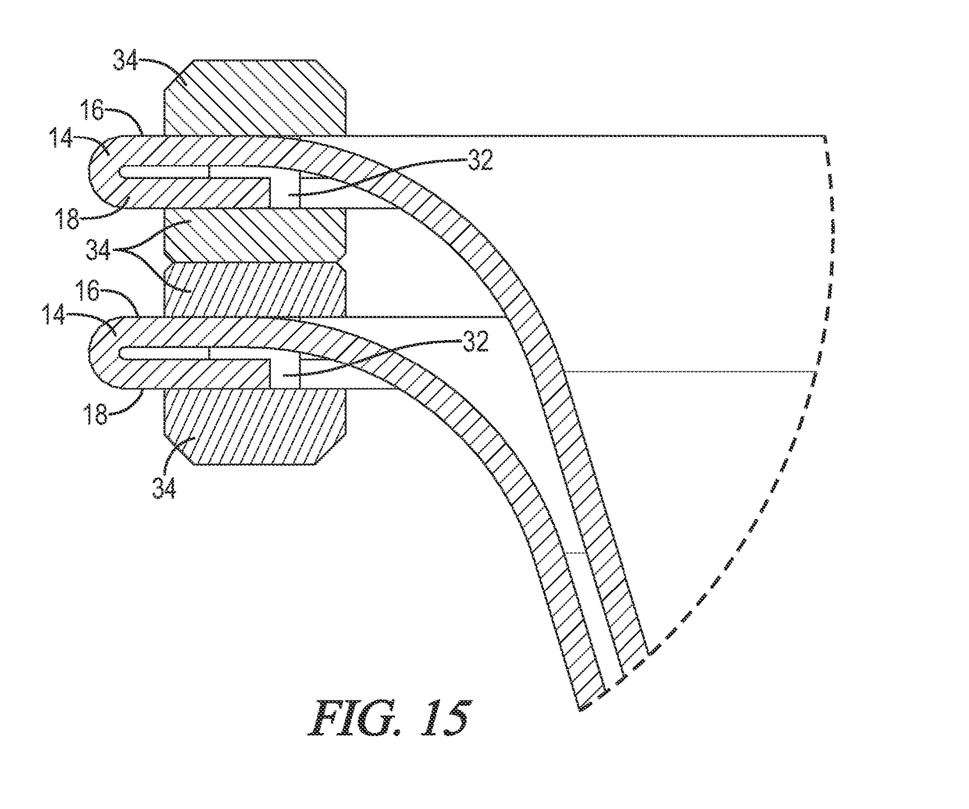
FIG. 15 is a magnified detail view of the objects at location 15 of FIG. 14.
Figure 16:
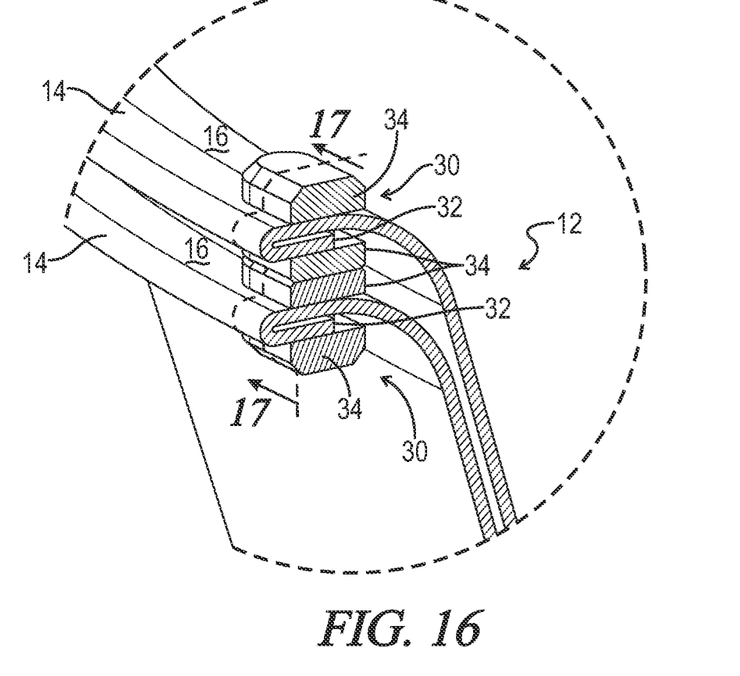
FIG. 16 is an isometric view of the objects of FIG. 15.
Figure 17:
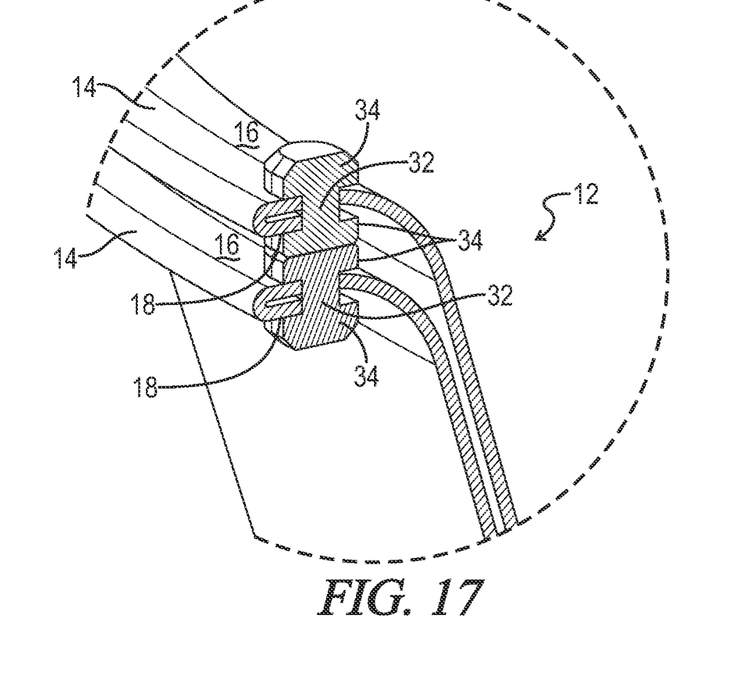
FIG. 17 is a sectional view taken along line 17-17 of FIG. 16.

Each alignment magnet 15 can be affixed to the respective tab 22 of each piece of dishware $B_1$, $B_2$, P by a magnet housing 24. Each magnet housing 24 can be made from any suitably durable polymeric material, such as polypropylene or acetyl. Each magnet housing 24 contains one alignment magnet 15. Each magnet housing 24 extends through a hole 21 in the tab 20 of each dishware rim 14 such that the magnet housing 24 extends above the upper surface 16 and below the lower surface 18 of the rim 14. Each magnet housing 24 also defines each recess 22 in the lower surface 18 of each rim 14. As best shown in FIG. 13, the magnet housings 24 affix the alignment magnets 15 to the rim 14 above the upper surface 16 of the tabs 20. Each magnet housing 24 and the magnet 15 contained therein forms a protrusion 25 that extends above the upper surface 16 of the tab 20. The protrusion 25 is receivable in the recess 22 of an overlying nested (i.e., adjacent) piece of dishware $B_1$, $B_2$, P or utensil F, K. When the protrusion 25 of a first piece of dishware is received in the recess of a recess 22 of an overlying nested piece of dishware, the alignment magnet contained in the magnet housing 24 of the first piece of dishware engages the alignment magnet 15 contained in the magnet housing 24 of the second piece of dishware to secure the two pieces of dishware together. In other embodiments, each magnet housing 24 can affix an alignment magnet 15 below the lower surface 18 of the rim 14 and define a recess 22 in the upper surface 16 of the rim 14.

Referring now to FIGS. 7-9 and 13, each magnet housing 24 is formed a female portion 26 and a male portion 28. The female portion 26 defines the recess 22 of each piece of dishware $B_1$, $B_2$, P. The male portion 28 defines the protrusion 25 of each piece of dishware $B_1$, $B_2$, P. The protrusion 25 is receivable in a recess 22 of another piece of dishware $B_1$, $B_2$, P or utensil F, K. The male portion 28 also defines an internal cavity 29 in which an alignment magnet 15 is received. The female portion 26 is secured to the male portion 28 to seal the magnet 15 inside the magnet housing 24. The female portion 26 can be secured to the male portion 28 using methods known in the art, including but not limited to sonic welding, adhesive, friction fits, and the like. The female portion 26 defines a protruding stop 27. The stop 27 is engaged with a notch 31 formed in one side of the hole 21 in each rim 14. Engagement of the stop 27 with the notch 31 prevents the magnet housing 24 from rotating or spinning with the hole 21, and thereby reduces rattling when pieces of dishware $B_1$, $B_2$, P are nested in a stack for storage or transport.

Turning now to FIGS. 10-17, each piece of dishware $B_1$, $B_2$, P in a system of nesting magnetic tableware 10 of the present invention can further include one or more bumpers 30. The bumpers 30 are configured to absorb shock, reduce rocking, rattling, and vibration, and dampen sound produced when multiple pieces of nested magnetic dishware $B_1$, $B_2$, P are transported or otherwise moved. Each piece of dishware $B_1$, $B_2$, P includes a pair of bumpers 30. A pair of bumpers 30, combined with a pair of alignment magnets 15 and corresponding recesses 22 as noted above, can provide four points of contact between the rims 14 of adjacent pieces of nested dishware $B_1$, $B_2$, P in a stack, thereby maximizing stability of the stack and minimizing sound produced by each piece of dishware $B_1$, $B_2$, P therein during transport.

Each bumper 30 of each pair is affixed to the rim 14 at opposing lateral sides of the well 12 and is spaced around the rim 14 substantially equidistantly between the pairs of tabs 20 and alignment magnets 15. Each bumper 30 extends through the rim 14 both above the upper surface 16 and below the lower surface 18. Each pair of bumpers 30 on each piece of dishware $B_1$, $B_2$, P is configured to engage the pair of bumpers 30 on an adjacent piece of dishware $B_1$, $B_2$, P when the pair of magnets 15 of one of the pieces of dishware $B_1$, $B_2$, P is engaged with the pair of recesses 22 in the other piece of dishware $B_1$, $B_2$, P. Put differently, four pairs of bumpers 30 on two vertically adjacent (i.e., nested) pieces of dishware $B_1$, $B_2$, engage each other to stabilize and dampen vibration of the pieces of dishware $B_1$, $B_2$, when the magnets 15 of one piece are engaged with the recesses 22 of another piece, as best shown in FIGS. 11-17. In this way, each pair of bumpers 30 on each piece of dishware $B_1$, $B_2$, P engages the pair of bumpers 30 of each respective overlying and underlying piece of dishware when multiple pieces of dishware $B_1$, $B_2$, P are nested in a stack.

To ensure that the bumpers 30 do not become dislodged from the rims 14 of the dishware, the rim 14 of each piece of dishware can include two pairs of secondary apertures 31 defined therethrough at opposing lateral sides of the well 12. A portion of each bumper 30 can extend through each secondary aperture 31. In some embodiments, each bumper 30 can include two spaced support posts 32 and two opposing (i.e., upper and lower) extension portions 34. The support posts 32 extend through each pair of secondary apertures 31. The upper and lower extension portions 34 connect the support posts 32 above the upper surface 16 and below the lower surface 18 of the rim 14. Formation of the bumpers 30 around (i.e., through, over, and under) a portion of each rim 14 prevents the bumpers 30 from becoming inadvertently dislodged from the rim 14. Each bumper 30 can be secured to the rim 14 and the secondary aperture 31 by overmolding. Each bumper 30 can be formed from any durable elastic material, including thermoplastic polyurethane, rubber, and the like.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments described herein it is not intended that such references be construed as limitations upon the scope thereof except as set forth in the following claims.

What is claimed is:

1. A system of nesting magnetic tableware, comprising:
a first piece of dishware, comprising:
    a well,
    a substantially planar rim extending from the well, the rim having opposing upper and lower surfaces, the rim having at least one aperture,
    at least one magnet affixed to the rim either above the upper surface or below the lower surface,
    at least one bumper affixed to the rim and spaced around the rim from the at least one magnet, the at least one bumper configured to extend above the upper surface and below the lower surface of the rim, wherein the at least one bumper is comprised of a different material than the well, and wherein at least a portion of the at least one bumper extends through the at least one aperture, and
    at least one recess corresponding to the at least one magnet in the surface of the rim opposing the surface of the rim to which the at least one magnet is affixed.

2. The system of claim 1, wherein:
the at least one magnet is a plurality of magnets affixed to the rim either above the upper surface or below the lower surface;
each magnet is spaced around the rim from each other magnet;
the at least one recess is a plurality of recesses in the surface of the rim opposing the surface of the rim to which the plurality of magnets is affixed; and
each recess is vertically aligned with each respective magnet.

3. The system of claim 1, wherein:
the at least one magnet is a pair of magnets affixed to the rim either above the upper surface or below the lower surface at opposing lateral sides of the well; and
the at least one recess is a pair of recesses in the surface of the rim opposing the surface of the rim to which the pair of magnets is affixed.

4. The system of claim 3, wherein:
the rim defines a pair of tabs at the opposing lateral sides of the well;
the pair of magnets is affixed to the pair of tabs either above the upper surface or below the lower surface; and
the pair of recesses is in the surface of the pair of tabs opposing the surface of the tabs to which the pair of magnets is affixed.

5. The system of claim 4, wherein:
the pair of magnets is affixed to the pair of tabs above the upper surfaces thereof, and
the pair of recesses is in the lower surfaces of the pair of tabs.

6. The system of claim 1, further comprising:
a second piece of dishware, comprising:
    a well,
    a substantially planar rim extending from the well, the rim having opposing upper and lower surfaces,
    at least one magnet affixed to the rim either above the upper surface or below the lower surface,
    at least one bumper affixed to the rim and spaced around the rim from the at least one magnet, the at least one bumper configured to extend above the upper surface and below the lower surface of the rim, and
    at least one recess corresponding to the at least one magnet in the surface of the rim opposing the surface of the rim to which the at least one magnet is affixed;
wherein the at least one magnet of one of the pieces of dishware engages the at least one recess of the other piece of dishware when the first and second pieces of dishware are nested and the magnets thereof are placed in proximity to one another.

7. The system of claim 6, wherein:
the at least one magnet of the first piece of dishware is a pair of magnets affixed to the rim either above the upper surface or below the lower surface at opposing lateral sides of the well;
the at least one recess of the first piece of dishware a pair of recesses in the surface of the rim opposing the surface of the rim to which the pair of magnets is affixed, each recess of the pair of recesses corresponding to a respective magnet of the pair of magnets;
the at least one magnet of the second piece of dishware is a pair of magnets affixed to the rim either above the upper surface or below the lower surface at opposing lateral sides of the well;
the at least one recess of the second piece of dishware a pair of recesses in the surface of the rim opposing the surface of the rim to which the pair of magnets is affixed, each recess of the pair of recesses corresponding to a respective magnet of the pair of magnets; and
the pair of magnets of one of the pieces of dishware engages the pair of recesses of the other piece of dishware when the first and second pieces of dishware are nested and the respective pairs of magnets are placed in proximity to one another.

8. The system of claim 7, wherein:
the at least one bumper on the rim of the first piece of dishware is a pair of bumpers at opposing lateral sides of the well, the pair of bumpers spaced around the rim substantially equidistantly between the pair of magnets; and
the at least one bumper on the rim of the second piece of dishware is a pair of bumpers at opposing lateral sides of the well, the pair of bumpers spaced around the rim substantially equidistantly between the pair of magnets;

wherein each pair of bumpers engages the other pair of bumpers when the pair of magnets of one of the pieces of dishware is engaged with the pair of recesses of the other piece of dishware.

9. The system of claim 7, wherein:

the rim of the first piece of dishware defines a pair of tabs to which the pair of magnets is affixed at opposing lateral sides of the well;

the pair of recesses of the first piece of dishware are in the surface of the tabs opposing the surface of the tabs to which the pair of magnets is affixed;

the rim of the second piece of dishware defines a pair of tabs to which the pair of magnets is affixed at opposing lateral sides of the well; and the pair of recesses of the second piece of dishware are in the surface of the tabs opposing the surface of the tabs to which the pair of magnets is affixed.

10. The system of claim 3, further comprising:

a pair of magnet housings extending through the rim above the upper surface and below the lower surface; wherein:

each magnet of the pair of magnets is at least partially contained in a respective magnet housing; and each recess of the pair of recesses is defined by a respective magnet housing.

11. The system of claim 1, further comprising:

a utensil, comprising:
  a substantially planar portion having opposing upper and lower surfaces,
  a magnet affixed to the substantially planar portion either above the upper surface or below the lower surface, and
  a recess corresponding to the magnet in the surface of the substantially planar portion opposing the surface of the substantially planar portion to which the magnet is affixed;

wherein the at least one magnet of the first piece of dishware engages the recess of the utensil when the magnet of the utensil is placed in placed in proximity to the at least one magnet of the first piece of dishware.

12. A system of nesting magnetic tableware, comprising:

a first piece of dishware, comprising:
  a well,
  a rim extending from the well, the rim defining a pair of substantially planar tabs extending from opposing lateral sides of the well, each tab having opposing upper and lower surfaces, the rim having at least one aperture,
  at least one bumper affixed to the rim, the at least one bumper configured to extend above the upper surface and below the lower surface of the rim, wherein the at least one bumper is comprised of a different material than the well, and wherein at least a portion of the at least one bumper extends through the at least one aperture,
  a pair of magnets affixed to the pair of substantially planar tabs either above the upper surfaces or below the lower surfaces thereof, and
  a pair of recesses corresponding to the pair of magnets in the surfaces of the tabs opposing the surfaces of the tabs to which the pair of magnets is affixed; and a second piece of dishware, comprising:
  a well,
  a rim extending from the well, the rim defining a pair of substantially planar tabs extending from opposing lateral sides of the well, each tab having opposing upper and lower surfaces,
  a pair of magnets affixed to the pair of substantially planar tabs either above the upper surfaces or below the lower surfaces thereof, and
  a pair of recesses corresponding to the pair of magnets in the surfaces of the tabs opposing the surfaces of the tabs to which the pair of magnets is affixed;

wherein one of the first or second pairs magnets are pulled into engagement with one of the first or second pairs of recesses when the first and second pieces of dishware are nested and the first and second pairs of tabs are placed in proximity to one another.

13. The system of claim 12, wherein:

the pair of magnets of the first piece of dishware is affixed to the pair of tabs above the upper surfaces thereof;

the pair of recesses of the first piece of dishware is in the lower surfaces of the pair of tabs;

the pair of magnets of the second piece of dishware is affixed to the pair of tabs above the upper surfaces thereof; and the pair of recesses of the second piece of dishware is in the lower surfaces of the pair of tabs.

14. A system of nesting magnetic tableware, comprising:

a first piece of dishware, comprising:
  a well,
  a rim extending radially outward from the well, the rim defining a first pair of substantially planar tabs extending from opposing lateral sides of the well, each tab having opposing upper and lower surfaces, the rim having at least one aperture,
  at least one bumper affixed to the rim, the at least one bumper configured to extend above the upper surface and below the lower surface of the rim, wherein the at least one bumper is comprised of a different material than the well, and wherein at least a portion of the at least one bumper extends through the at least one aperture,
  a first pair of magnets affixed to the first pair of substantially planar tabs above the upper surfaces thereof, and
  a first pair of recesses in the lower surfaces of the first pair of substantially planar tabs, each recess sized and shaped to at least partially receive one of the first pair of magnets.

15. The system of claim 14, further comprising:

a first pair of bumpers on the rim at opposing lateral sides on the well, the first pair of bumpers spaced around the rim substantially equidistantly between the first pair of substantially planar tabs.

16. The system of claim 14, further comprising:

a second piece of dishware configured to nest at least partially within the first piece of dishware, the second piece of dishware comprising:
  a well,
  a rim extending radially outward from the well, the rim defining a second pair of substantially planar tabs extending from opposing lateral sides of the well, each tab having opposing upper and lower surfaces,
  a second pair of magnets affixed to the second pair of substantially planar tabs above the upper surfaces thereof, and
  a second pair of recesses in the lower surfaces of the second pair of substantially planar tabs, each recess sized and shaped to at least partially receive one of the first pair of magnets;

wherein the first and second pairs of magnets pull the first pair of magnets into engagement with the second pair of recesses when the second piece of dishware is nested with the first piece of dishware and the second pair of tabs are placed in proximity to the first pair of tabs.

17. The system of claim 16, further comprising:
a first pair of bumpers on the rim of the first piece of dishware at opposing lateral sides on the well, the first pair of bumpers spaced around the rim substantially equidistantly between the first pair of substantially planar tabs; and
a second pair of bumpers on the rim of the second piece of dishware at opposing lateral sides on the well, the second pair of bumpers spaced around the rim substantially equidistantly between the second pair of substantially planar tabs;
wherein the first and second pairs of bumpers engage each other when the first pair of magnets is engaged with the second pair of recesses.

18. The system of claim 17, wherein:
the first and second pairs of bumpers extend through the respective rims of the first and second pieces of dishware above the upper surfaces and below the lower surfaces thereof.

19. The system of claim 1, wherein the at least one bumper is comprised of rubber.

20. The system of claim 1, wherein the at least one bumper is comprised of thermoplastic polyurethane.

* * * * *